United States Patent
Aiwazian et al.

(10) Patent No.: US 7,359,819 B2
(45) Date of Patent: Apr. 15, 2008

(54) EVALUATION OF DEVICE DRIVER OUTPUT

(75) Inventors: Nicholas V. Aiwazian, Bothell, WA (US); Varun Saini, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 26 days.

(21) Appl. No.: 11/490,803

(22) Filed: Jul. 21, 2006

(65) Prior Publication Data

US 2008/0021667 A1    Jan. 24, 2008

(51) Int. Cl.
*G06F 11/00* (2006.01)
*G06F 17/00* (2006.01)

(52) U.S. Cl. .................. 702/108; 702/119; 702/123; 714/37; 714/38

(58) Field of Classification Search ............. 702/108, 702/119, 123
See application file for complete search history.

(56) References Cited

U.S. PATENT DOCUMENTS

2006/0010384 A1* 1/2006 Coco et al. ............... 715/716

OTHER PUBLICATIONS

"Self-Calibration and Coordinate Conversion for a Touchpad or Touch Screen Computer Input Device", Sep. 1, 1987, IBM Technical Disclosure Bulletin, vol. 30, issue 4, pp. 1663-1666.*
"Device Driver for a Touchpad or Touch Screen Computer Input Device", Sep. 1, 1987, IBM Technical Dislosure Bulletin, vol. 30, issue 4, pp. 1674-1676.*

* cited by examiner

*Primary Examiner*—Hal D Wachsman (57) ABSTRACT

The testing of driver output is automated. Embodiments of the invention filter out data that is known to change between two similar outputs of a driver. By filtering this dynamic data out, the remaining data can be compared to known-good data to identify any variations which would appear in a physical manifestation (e.g., a printout) of the data.

20 Claims, 7 Drawing Sheets

```xml
<?xml version="1.0"?>
<HPLaserjet4050PS>
    <NumFiles>69</NumFiles>
    <Filters>
        <Filter>
            <FileName>*</FileName>
            <OrigText>%%For: .+\b</OrigText>         601
            <NewText>%%For: SP_PRINT</NewText>
        </Filter>
        <Filter>
            <FileName>*</FileName>
            <OrigText>
                %%CreationDate: \d{1,2}/\d{1,2}/\d{4}   603
                \d{1,2}:\d{1,2}:\d{1,2}
            </OrigText>
            <NewText>
                %%CreationDate: 0/0/0000 00:00:00
            </NewText>
        </Filter>
        <Filter>
            <FileName>**</FileName>
            <OrigText>/__TT[\d\w]{2,10}00</OrigText>   605
            <NewText>/__TT0000o00</NewText>
        </Filter>
        <Filter>
            <FileName>**</FileName>
            <OrigText>/TT[\d\w]{2,10}00</OrigText>     607
            <NewText>/TT0000o00</NewText>
        </Filter>
    </Filters>
</HPLaserjet4050PS>
```

EVALUATION OF DEVICE DRIVER OUTPUT

BACKGROUND

Traditionally, peripheral output testing has been performed by running various test applications on machines connected to physical peripherals, such as printers, and manually verifying the physical output. For example, to test an updated printer driver, a test page would be printed using the updated printer driver and a human being would physically compare the printed test page to a baseline test page (e.g., a known-good test page). This is a very tedious process and can become very costly in terms of consumable resources, such as manpower, paper, and printer ink. The current method of testing is also error-prone as it relies on human ability to detect slight differences in output.

Moreover, specific device manufacturers can create viewers and verification tests to ensure that their device drivers function properly. This is because each device manufacturer has access to and is very familiar with the output format of all its devices, such as a Page Description Language (PDL) for printers. However, some entities, such as operating system developers, are responsible for verifying many different device drivers from many different device manufacturers. It is practically impossible to learn every device manufacturer's individual output description languages adequately enough for these entities to verify correctness.

An adequate device driver testing infrastructure has eluded those skilled in the art, until now.

SUMMARY

Embodiments of the invention are directed at automating the testing of driver output. Generally stated, embodiments of the invention filter out data that is known to change between two similar outputs of a driver. By filtering this dynamic data out, the remaining data can be compared to known-good data to identify any variations which would appear in a physical manifestation (e.g., a printout) of the data.

BRIEF DESCRIPTION OF THE DRAWINGS

Many of the attendant advantages of the invention will become more readily appreciated as the same becomes better understood with reference to the following detailed description, when taken in conjunction with the accompanying drawings, briefly described here.

Embodiments of the invention will now be described in detail with reference to these Figures in which like numerals refer to like elements throughout.

DETAILED DESCRIPTION OF THE DRAWINGS

Various embodiments are described more fully below with reference to the accompanying drawings, which form a part hereof, and which show specific exemplary implementations for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation, or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Generally stated, the described embodiments include mechanisms and techniques for testing driver output by normalizing the driver output such that only relevant output data is compared to known-good output data.

Illustrative Systems

The principles and concepts will first be described with reference to sample systems that may implement certain embodiments of the invention. These sample systems may be implemented using conventional or special purpose computing equipment programmed in accordance with the teachings of these embodiments.

Figure 1:
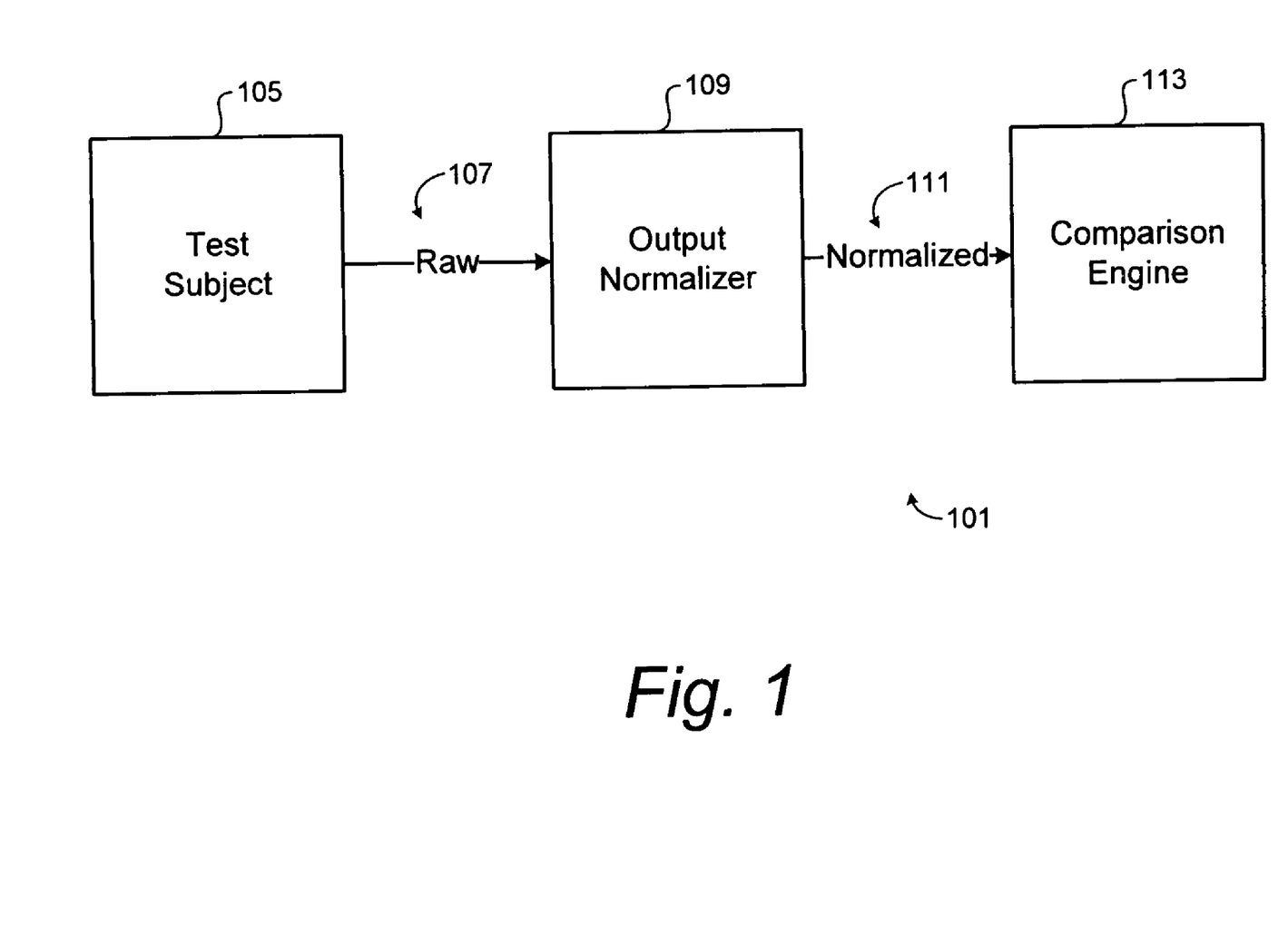
FIG. 1 is a functional block diagram generally illustrating a system for evaluating peripheral driver output, in accordance with one embodiment of the invention.

FIG. 1 is a functional block diagram generally illustrating functional components of one simple system 101 for testing peripherals configured in accordance with one embodiment. The system 101 includes a test subject 105, an output normalizer 109, and a comparison engine 113. The system 101 may be implemented on a computing device, such as that generally illustrated in FIG. 5 and described below.

The test subject 105 may be any computing components executing on a computing device and which include the subject of a test. The test subject 105 is a component for generating output data using the subject of the test. In this embodiment, the subject of the test may be any component that generates output, such as an application, a graphical device interface, a print subsystem, a device driver, and the like. However, for simplicity of discussion, the term "driver" will be used throughout this document to describe any such component. In one implementation, the test subject 105 includes device drivers which may have changed from a previous state. For example, a printer manufacturer may have developed a new version of a printer driver, or a video adapter manufacturer may have developed a new version of a video card driver. In those examples, the test subject 105 would include the new version(s) of those device drivers for testing.

The test subject 105 may further include components for simulating a predictable output. For example, the test subject 105 may include an automated agent for executing a script, or the like. The script would be configured to cause identical output data to be generated from execution to execution. In the system 101 described here, the test subject 105 provides raw output data 107 to an output normalizer 109. The raw output data 107 corresponds to the output data that would otherwise be provided directly to a peripheral by the test subject 105.

The output normalizer 109 may be any computing components executing on a computing device and configured to transform the raw output data 107 to normalized output data 111. In one embodiment, the raw output data 107 often includes two types of data: (1) test data which corresponds to the actual physical output of executing the test subject 105, and (2) dynamic data which does not alter the physical manifestation of the test data, but rather corresponds to other, variable information or circumstances. In one instance, the dynamic data reflects information included in the raw output data 107 by the test subject 105 based on specifications controlled by the device manufacturer for data being delivered to peripheral devices. The output normalizer 109 transforms the raw output data 107 into normalized output data 111 by modifying the dynamic data in a predictable manner. The output normalizer 109 provides the normalized output data 111 to a comparison engine 113.

The comparison engine 113 may be any computing components executing on a computing device and configured to evaluate the normalized output data 111 for materially significant failures. In this particular embodiment, a materially significant failure corresponds to differences between the normalized output data 111 and baseline data. In one implementation, the comparison engine 113 includes baseline data that corresponds to predicted output data that should have been generated by the test subject 105 during the test. In one particular example, the baseline data may be output data that was generated using a prior version of a device driver being tested. In this example, the baseline data would have generated a physical manifestation (e.g., printer output) that is known to be acceptable or is at least in a known state. The comparison of the normalized output data 111 to the baseline data reveals whether the test would have resulted in an identical physical manifestation if the raw output data 107 would have been provided to the actual peripheral.

Generally stated, the test subject 105 generates raw output data 107, which includes dynamic data. The output normalizer 109 transforms the raw output data 107 into normalized output data 111, which includes only data that should affect the physical manifestation of the raw output data 107. The comparison engine 113 evaluates the normalized output data 111 to identify any variations between the normalized output data 111 and known-good output data. Specific examples of these general concepts will now be described through a discussion of additional embodiments.

Figure 2:
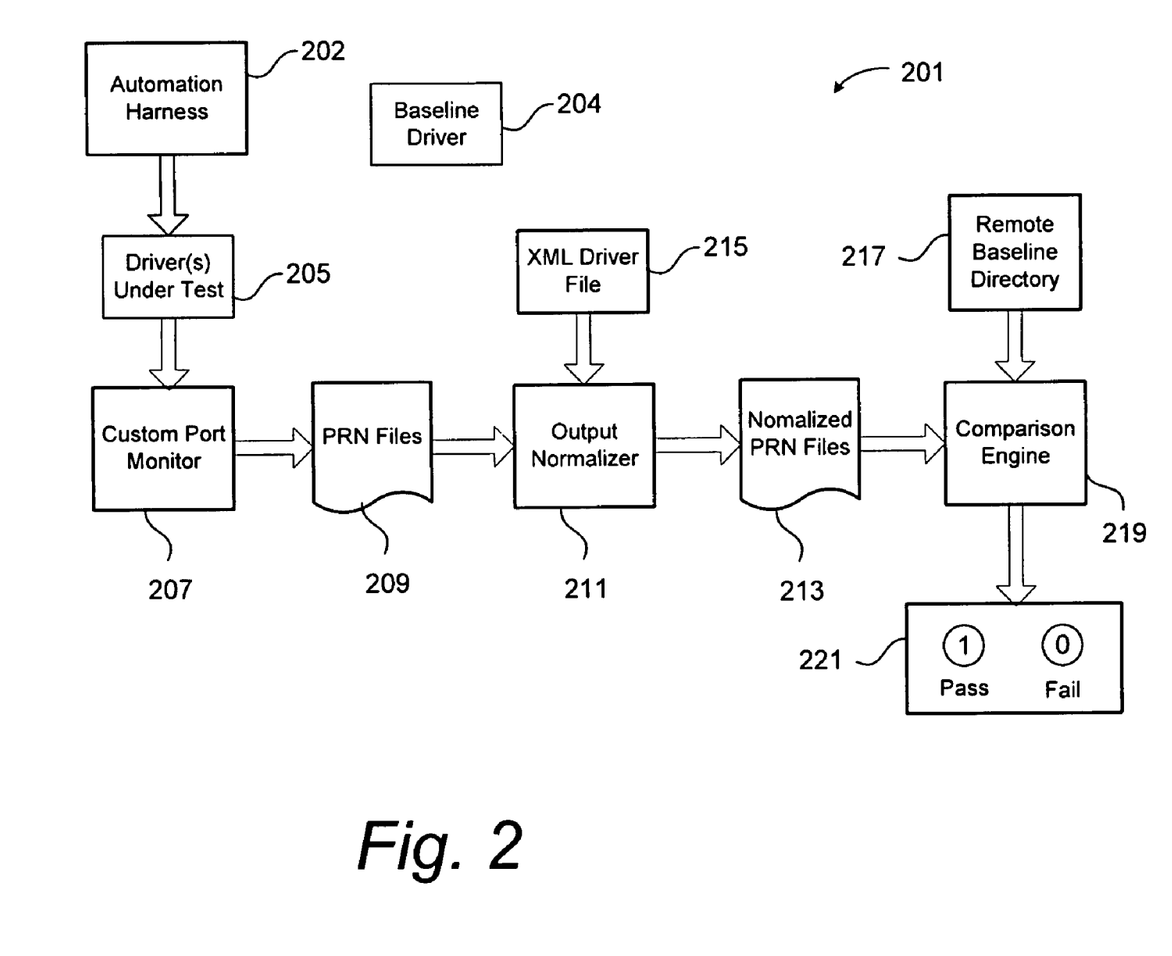
FIG. 2 is a functional block diagram generally illustrating a sample output data stream that may be generated by a peripheral printer driver.

FIG. 2 is a functional block diagram of another embodiment illustrating in greater detail components of a system 201 for testing peripherals. The components of the system 201 may be implemented as computer-executable components on a computing device, such as that illustrated in FIG. 5 and described below.

As illustrated, the system 201 represents a test environment in which a device driver 205 is being tested. In this example, the device driver 205 represents an updated, patched, or otherwise modified version of a baseline device driver 204. Generally stated, the device drivers (204, 205) may be any executable components configured to generate output data that is intended to have a predictable physical manifestation. In certain non-exhaustive and non-limiting examples, the device drivers (204, 205) may be executable components that interface with a printing, video, audio, and/or file subsystem and/or directly with applications executing on a computer system. The device drivers (204, 205) may also interface, directly or indirectly, with a peripheral device operative to transform the output from the device drivers to a physical manifestation, such as printers, video cards, audio cards, flash memory cards, or the like.

An automation harness 202 exemplifies an agent or automated component for creating a scenario that has a repeatable set of output data. In one specific example, the automation harness 202 may be implemented as components for causing a word processing program, or the like, to generate a document having several elements, and for causing the word processing program to generate a print job based on the generated document. Generally stated, the automation harness 202 is configured to initialize a job that causes the driver 205 to generate predictable output. The automation harness 202, which may include simulated or automated applications, passes instructions and data to the driver 205 for output on the peripheral device with which the driver 205 is associated.

In this embodiment, a custom port monitor 207 is inserted into the driver's output path. For example, in many computing environments, data is passed from its originator (e.g., a word processing application) to its eventual final destination (e.g., a printer) through what is referred to as a "driver stack." The driver stack is essentially a group of components that are bound or chained together such that the output of each component becomes the input of the subsequent component in the stack.

In accordance with this embodiment, a custom port monitor 207 is inserted in the driver stack of the driver 205 under test. In this way, the port monitor 207 can intercept the raw data stream being output by the driver 205 on its way to a peripheral. Inserting drivers and other executables in driver stacks is known in the art and need not be discussed in greater detail. In addition, inserting a driver in a driver stack is but one mechanism for redirecting the output of a driver and many other examples will be apparent to those skilled in the art. For example, an auxiliary hardware device may be coupled to an output port of the host computing device for reading the output at the physical port. Many other examples will be apparent.

Figure 3:
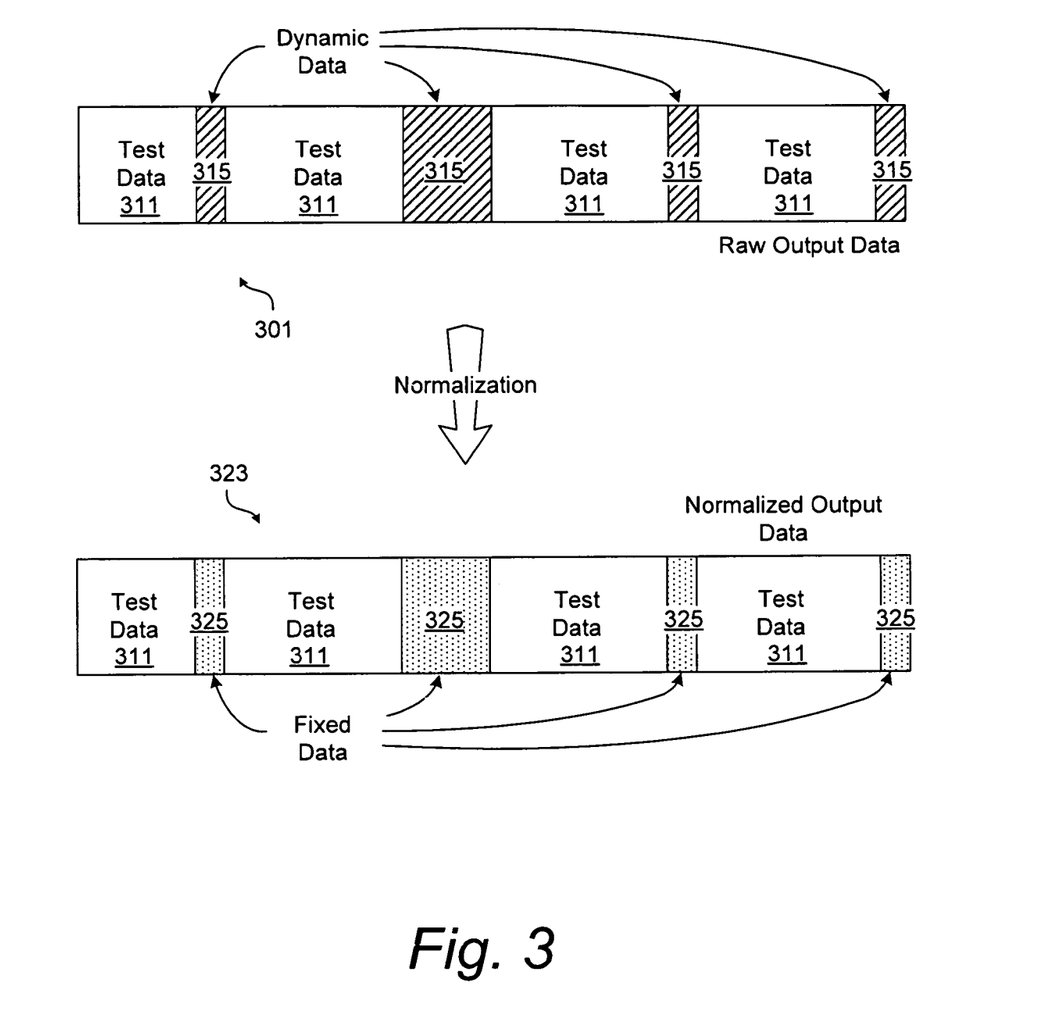
FIG. 3 is a graphical representation of raw output data being transformed into normalized output data.

In this embodiment, the custom port monitor 207 saves the raw data stream from the driver 205 as raw output data 209 rather than passing the data to its intended peripheral. The format of the raw output data 209 is illustrated in FIG. 3 and described below. The port monitor 207 may write the raw output data 209 to a predetermined location as a binary file.

An output normalizer 211 receives the raw output data 209 and normalizes it into normalized output data 213. As introduced above, the raw output data 209 may include dynamic data that represents information that may not impact the physical manifestation of the raw output data 209, but which may not be predictable (e.g., timestamps or other randomly generated information). In one specific implementation, the output normalizer 211 may be configured with a location at which resides one or more files containing raw output data 209, such as may be generated for different runs of the automation harness 202.

The output normalizer 211 of this embodiment refers to a descriptive document (XML driver file 215) that specifies the dynamic data for the particular language (e.g., a Page Description Language or "PDL") used by the driver 205. In one particular implementation, the XML driver file 215 specifies each known dynamic data element using regular expressions.

Figure 6:
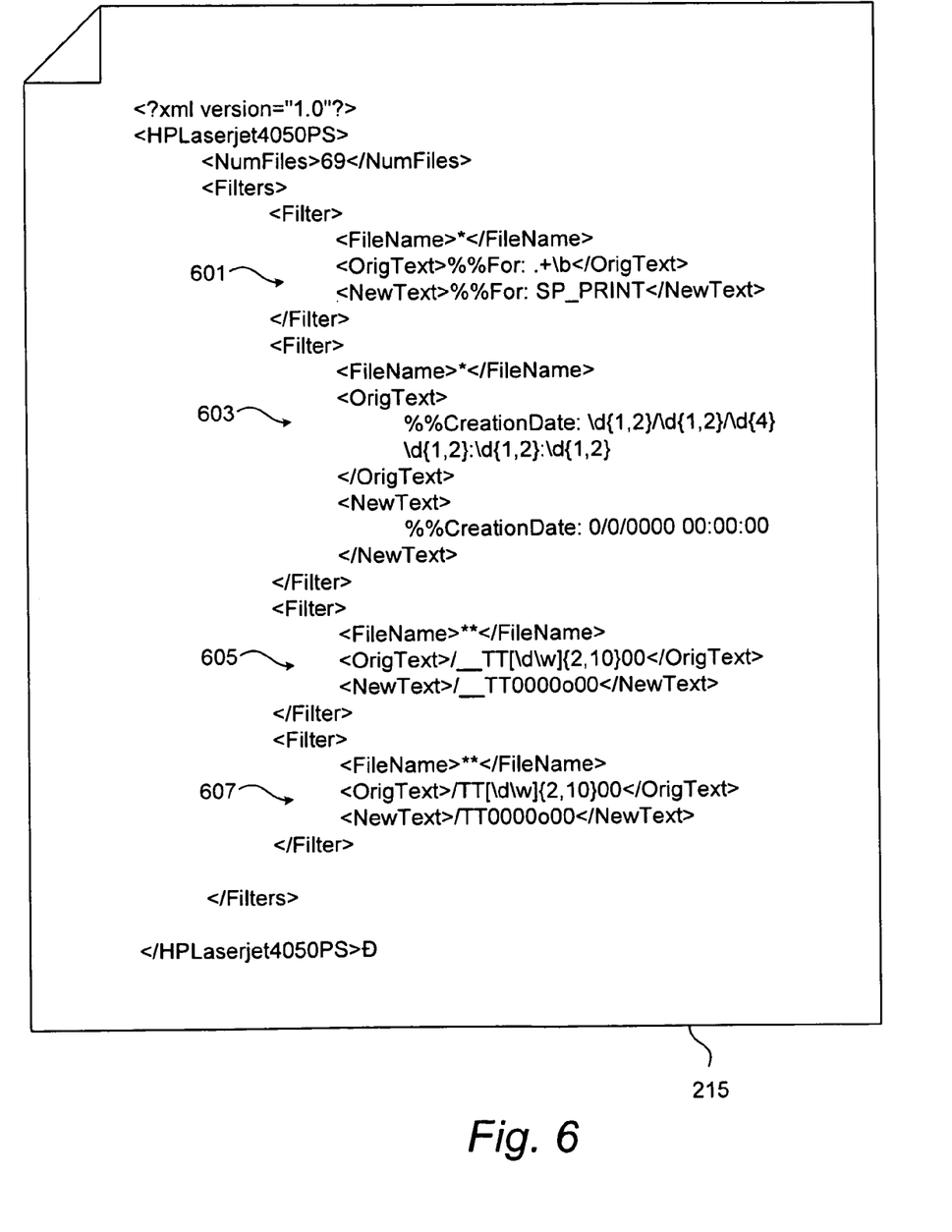
FIG. 6 is a graphical representation of a sample format for the XML driver file that may be used in certain implementations.

Turning briefly to FIG. 6, illustrated is a sample format for the XML driver file 215 that may be used in certain implementations of this embodiment. As illustrated in FIG. 6, the sample XML driver file 215 identifies four elements of dynamic data: a user name 601, a creation date 603, a randomly generated font name beginning with "/_TT" 605, and a randomly generated font name beginning with "/TT" 607. For each element of dynamic data, the XML driver file 215 identifies a string or data to search for in each file of raw output data <OrigText>, and specifies a replacement string or data <NewText> for each element. In this way, the random dynamic data can be replaced with fixed data so that the dynamic data will not cause a false indication that the output data will result in a different physical manifestation.

Returning again to FIG. 2, based on the XML driver file 215, the output normalizer 211 transforms the raw output data 209 into normalized output data 213. The process of normalizing the raw output data 209 is illustrated in greater detail in FIG. 3 and described below.

A comparison engine 219 compares the normalized output data 213 to baseline output data 217. In this embodiment, the baseline output data 217 represents the raw output data created by executing the automation harness 202 in conjunction with the original (baseline) driver 204. The baseline output data 217 has also been normalized so that any dynamic data within the baseline output data 217 is the same as the replaced dynamic data in the normalized output data 213. Accordingly, the baseline output data 217 should be exactly identical to the normalized output data 213 unless the new driver 205 introduced an alteration in the output data that would result in a variation in the physical output.

Figure 4:
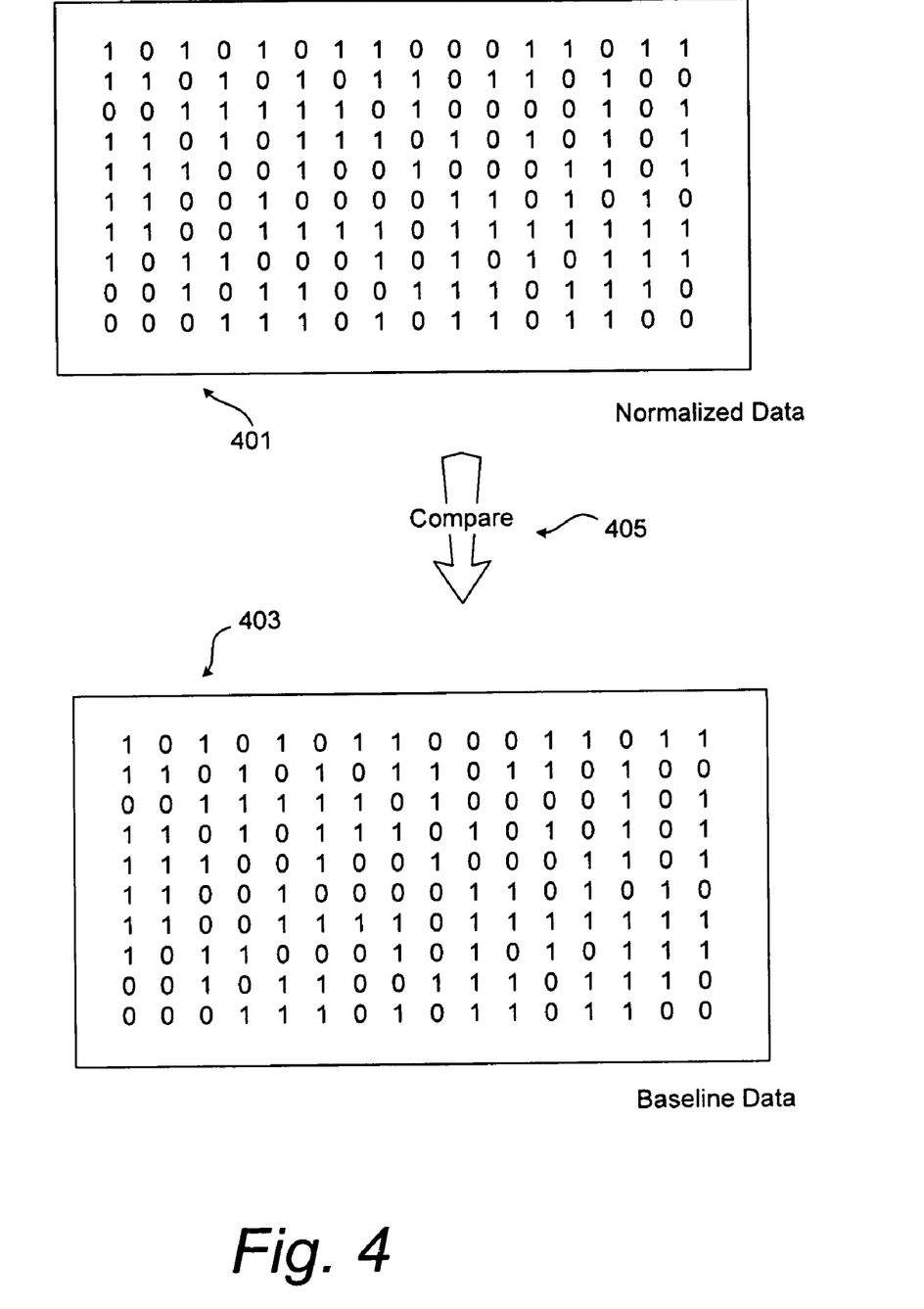
FIG. 4 is a graphical representation of a comparison of normalized output data to baseline output data.

Turning briefly to FIG. 4, illustrated is a graphical representation of a comparison of normalized output data 401 to baseline output data 403. The normalized output data 401 and the baseline output data 403 are illustrated as lengthy series of binary values, which exemplifies the output data that would be generated by a typical device driver. In one enhancement, the comparison 405 may include computing a hash value, perhaps using the well known MD5 hash algorithm, of both files (401, 403) for comparison, and then comparing the resultant hash values, thus speeding up the comparison.

Returning now again to FIG. 2, once the comparison engine 219 has performed its comparison, an output function 221 is used to indicate either a pass or fail situation. In this implementation, passing means that there is no material variation between the normalized output data 213 and the baseline output data 217, and failure means that there is.

FIG. 3 is a graphical representation of raw output data 301 being transformed into normalized output data 323. As discussed above, the raw output data 301 includes two types of information: test data 311 that represents the data that will result in or affect a physical manifestation of the raw output data 301, and dynamic data 315 that does not. Again, as mentioned above, the dynamic data 315 can include any number of or categories of information, such as a logged in user, date, time, machine name, and the like. Some data formats may contain little or no dynamic data, while others may contain much more. For this reason, a different descriptive document (e.g., XML driver file 215) may be used in conjunction with each data format (e.g., each PDL).

The raw output data 301 is transformed (normalized) by either removing the dynamic data 315 or by replacing the dynamic data 315 with fixed data 325, where the fixed data 325 represents a predictable (i.e., non-random) set of data so that the dynamic data 315 does not cause a false positive when comparing the test data 311 to baseline test data in a stream of baseline output data.

Figure 5:
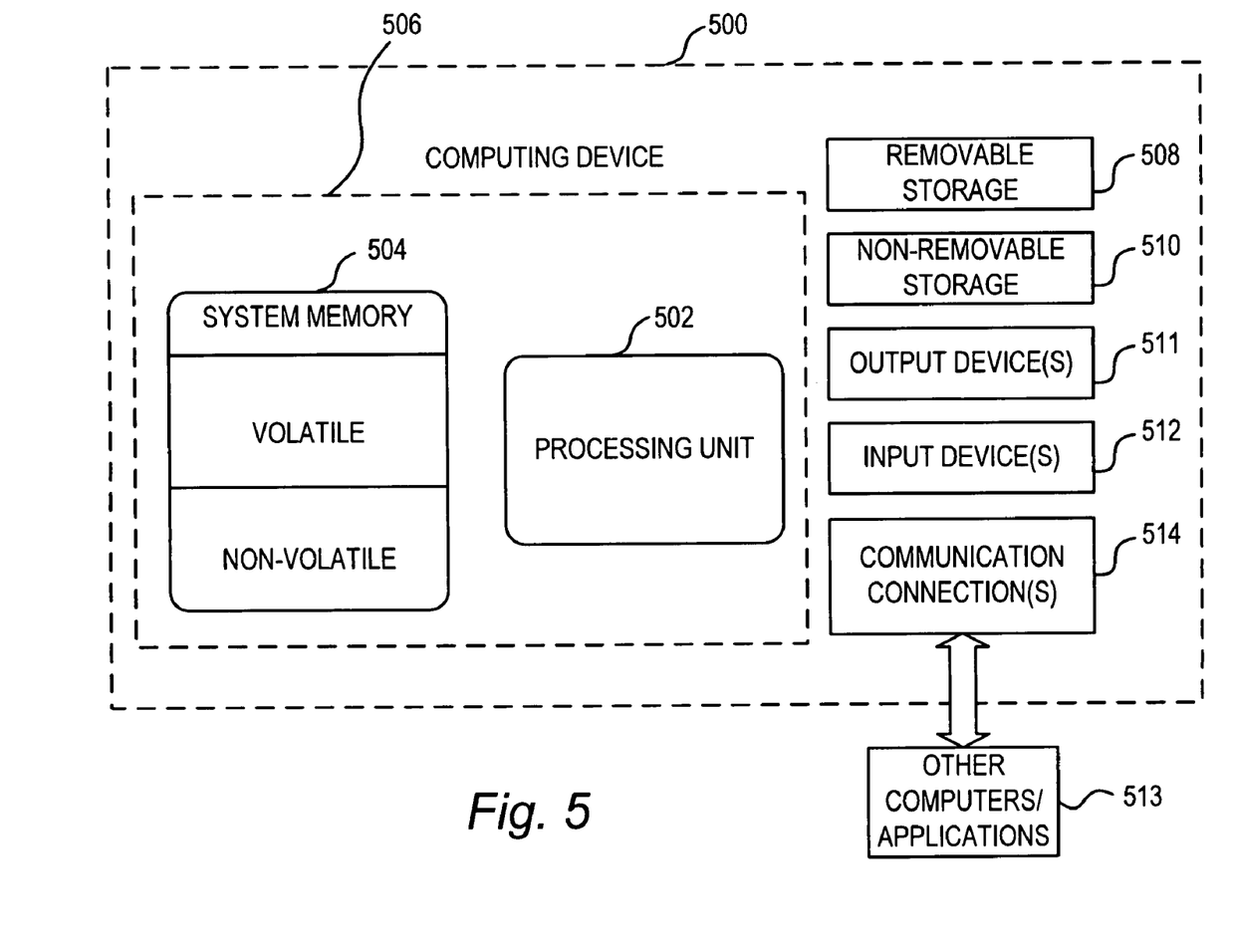
FIG. 5 is a functional block diagram of an exemplary computing device that may be used to implement one or more embodiments of the invention.

FIG. 5 is a functional block diagram of an exemplary computing device 500 that may be used to implement one or more embodiments of the invention. The computing device 500, in one basic configuration, includes at least a processing unit 502 and memory 504. Depending on the exact configuration and type of computing device, memory 504 may be volatile (such as RAM), non-volatile (such as ROM, flash memory, etc.) or some combination of the two. This basic configuration is illustrated in FIG. 5 by dashed line 506.

Additionally, device 500 may also have other features and functionality. For example, device 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with one or more computers and/or applications 513. Device 500 may also have input device(s) 512 such as keyboard, mouse, pen, voice input device, touch input device, etc. Output device(s) 511 such as a monitor, speakers, printer, PDA, mobile phone, and other types of digital display devices may also be included. These devices are well known in the art and need not be discussed at length here.

Illustrative Processes

The principles and concepts will now be described with reference to sample processes that may be implemented by a computing system in certain embodiments of the invention.

Figure 7:
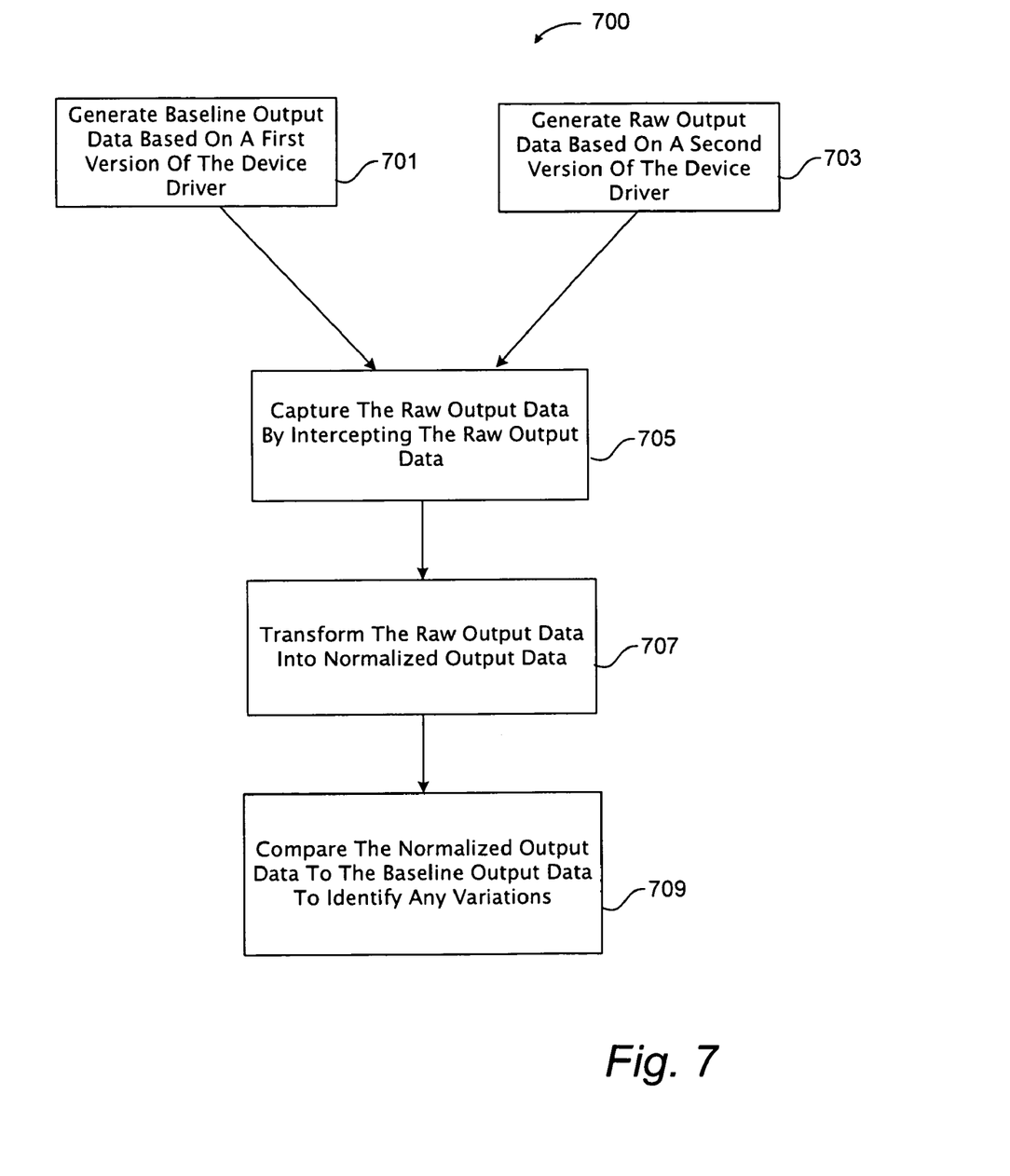
FIG. 7 is an operational flow diagram generally illustrating a process for testing a device driver.

FIG. 7 is an operational flow diagram generally illustrating a process 700 for testing a device driver. The process may be implemented using computer-executable instructions in software or firmware, but may also be implemented in other ways, such as with programmable logic, electronic circuitry, or the like. In some alternative embodiments, certain of the operations may even be performed with limited human intervention. Moreover, the process is not to be interpreted as exclusive of other embodiments, but rather is provided as illustrative only.

At step 701, baseline output data is generated based on a first version of the device driver. In one embodiment, an automation harness is used to execute repeatable operations, such as a script of instructions or other commands, for causing output to be generated. In one particular implementation, the output is generated by a peripheral device, such as a printer, a video card, a sound card, a flash memory card, a fax machine, or the like. The baseline output data may also include known dynamic data (fixed data) or be normalized so that the entire baseline output data is in a known and repeatable state.

At step 703, raw output data is generated based on a second version of the device driver. In one implementation, the second version of the device driver may represent an upgraded or patched version of the first version. The raw output data may be generated by the automation harness used in conjunction with generating the baseline output data.

At step 705, the raw output data is captured by intercepting the raw output data intended for delivery to a peripheral device. In one implementation, a port monitor may be used to redirect the raw output data from a particular data port to a data capture component. The captured, raw output data may be stored as files.

At step 707, the raw output data is transformed into normalized output data by locating dynamic data within the raw output data and altering the dynamic data in a predictable manner. The dynamic data represents information included in the raw output data in accordance with a particular peripheral device design.

At step 709, the normalized output data is compared to the baseline output data to identify any variations. By identifying variations between test data in the baseline output data and the normalized output data, flaws in the second version of the device driver can be identified. In addition, these flaws can be identified without actually generating physical output, such as printed pages.

The advantages of the invention are many. For example, embodiments may be used as a reliable way of determining very small changes in output (e.g., could detect when a double pixel width line shows up where previous was only one pixel wide). In addition, embodiments of the invention enable testing many more drivers in less time while greatly reducing the cost of testing (e.g., printer ink, manpower time, paper, etc.) Still further, any new PDL can be added to a test suite with very little overhead.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. In one particular example, the term "driver" is used throughout to mean any executable component operative to generate output on a peripheral device, and may include applications, peripheral subsystems, interfaces, and device drivers.

The invention claimed is:

1. A computer-readable storage medium having computer-executable instructions for testing a device driver, comprising:
   instructions for generating baseline output data based on a first version of the device driver;
   instructions for generating raw output data based on a second version of the device driver;
   instructions for capturing the raw output data by intercepting the raw output data intended for delivery to a peripheral device;
   instructions for transforming the raw output data into normalized output data by locating dynamic data within the raw output data and replacing the dynamic data with fixed data and/or by removing the dynamic data, the dynamic data representing information included in the raw output data in accordance with a particular peripheral device design; and
   instructions for comparing the normalized output data to the baseline output data to identify any variations in test data within the baseline output data and the normalized output data.

2. The computer-readable storage medium recited in claim 1, wherein generating the baseline output data comprises executing an automated test scenario for generating a predictable output using the first version of the device driver.

3. The computer-readable storage medium recited in claim 2, wherein generating the raw output data comprises executing the automated test scenario using the second version of the device driver.

4. The computer-readable storage medium recited in claim 1, wherein the device driver comprises a computer-executable component configured to generate output data that is intended to have a predictable physical manifestation.

5. The computer-readable storage medium recited in claim 1, wherein the device driver comprises a peripheral device driver configured to provide output data to a peripheral device.

6. The computer-readable storage medium recited in claim 5, wherein the peripheral device comprises a printer, a video card, a sound card, a scanner, a flash memory card, or fax machine.

7. The computer-readable storage medium recited in claim 1, wherein altering the dynamic data comprises replacing the dynamic data with fixed data.

8. The computer-readable storage medium recited in claim 1, wherein the dynamic data comprises data that does not affect a physical manifestation of the raw output data.

9. The computer-readable storage medium recited in claim 1, wherein comparing the normalized output data to the baseline output data comprises comparing hash values taken of the normalized output data and of the baseline output data.

10. A computer-readable storage medium encoded with computer-executable instructions for testing a driver, comprising:
    instructions for capturing raw output data from the driver by coupling the driver to a port monitor, the driver being configured to deliver the raw output data to a peripheral device;
    instructions for normalizing the raw output data by replacing dynamic data in the raw output data with fixed data and/or by removing the dynamic data, the dynamic data comprising information that does not affect a physical manifestation of the raw output data produced by the peripheral device; and
    instructions for comparing the normalized raw output data to baseline output data that represents known-good test data including the fixed data, the comparison being performed without necessarily delivering the raw output data to the peripheral device.

11. The computer-readable storage medium recited in claim 10, wherein the baseline output data represents output data created by a first version of the driver and the raw output data represents output data created by a second version of the driver.

12. The computer-readable storage medium recited in claim 10, wherein the driver comprises a peripheral device driver configured to provide output data to the peripheral device.

13. The computer-readable storage medium recited in claim 12, wherein the peripheral device comprises a printer, a video card, a sound card, a scanner, or a flash memory card.

14. The computer-readable storage medium recited in claim 10, wherein comparing the normalized output data to the baseline output data comprises comparing hash values taken of the normalized raw output data and of the baseline output data.

15. The computer-readable storage medium recited in claim 10, wherein capturing the raw output data further comprises executing an automated test scenario that causes a repeatable set of output data to be generated each time the automated test scenario is executed.

16. A computer-readable storage medium encoded with computer-executable components, comprising:
 a computer-executable automation harness configured to execute a script that describes a series of operations to generate a repeatable output from execution to execution, the automation harness being coupled to a driver and being further configured to generate raw output data based on the repeatable output;
 a computer-executable normalizer configured to transform the raw output data into normalized output data by identifying dynamic data within the raw output data and replacing the dynamic data with fixed data and/or by removing the dynamic data; and
 a computer-executable comparison engine configured to accept the normalized output data and the raw output data, the comparison engine being further configured to compare the normalized output data to the raw output data to identify variations in test data within the normalized output data and the raw output data, the comparison engine being still further configured to output an indication of any identified variations.

17. The computer-readable storage medium recited in claim 16, further comprising a descriptive document that identifies the dynamic data within the raw output data, and wherein the normalizer identifies the dynamic data with reference to the descriptive document.

18. The computer-readable storage medium recited in claim 17, wherein the descriptive document comprises an eXtensible Markup Language (XML) document including elements that correspond to each item of dynamic data in the raw output descriptive document.

19. The computer-readable storage medium recited in claim 17, wherein the descriptive document is associated with a page description language.

20. The computer-readable storage medium recited in claim 16, wherein the comparison engine is further configured to compute hash values of the normalized output data and the baseline output data for use in the comparison of the normalized output data to the baseline output data.

\* \* \* \* \*